Nov. 24, 1931.           S. S. MATTHES           1,832,940

SPLICER

Filed Dec. 27, 1929

WITNESS:
H. J. Stromberger

Inventor
SAMUEL S. MATTHES
By
Attorney

Patented Nov. 24, 1931

1,832,940

UNITED STATES PATENT OFFICE

SAMUEL S. MATTHES, OF MANSFIELD, OHIO, ASSIGNOR TO THE OHIO BRASS COMPANY, OF MANSFIELD, OHIO, A CORPORATION OF NEW JERSEY

SPLICER

Application filed December 27, 1929. Serial No. 416,979.

My invention relates to splicers for cables and for dead ending cables.

The object of my invention is to provide an improved splicer in which the tension upon the individual wires or layers of wire will be more equally distributed than in the ordinary type of wedged splicer.

At the present development of the art special cables are employed having a high strength core and a high conductivity layer about the core. The core may be composed of steel or high strength bronze, both of which will have a low conductivity electrically while the outer layer or layers will be composed of pure copper of low tensile strength, but high conductivity. With such cables and in fact with all cables the stress upon the individual wires and layers should be made as uniform as possible so that each unit of the cable will bear its own portionate share of the load, otherwise some portions will be overstressed and possibly weakened by being unduly stretched. This is particularly true of cables having a high strength core for if the maximum amount of stress is carried by the outer layer of the cable composed of copper then the main conducting portion of the cable is liable to be drawn out and reduced in cross section and finally broken.

My invention resides in the new and novel construction, combination and relation of the various elements hereinafter described and shown in the drawings accompanying this specification.

In the drawings:—

Figure 1:
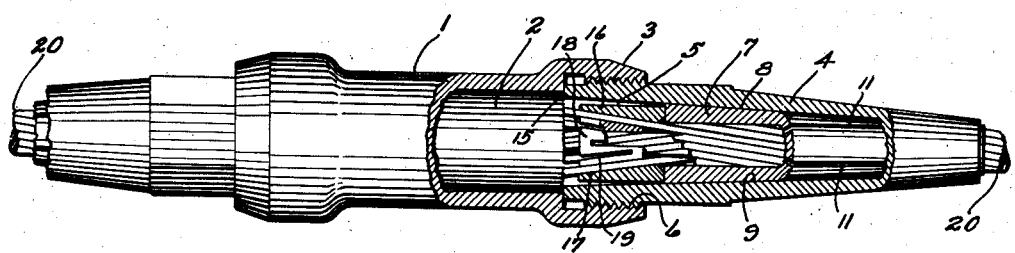
Fig. 1 is a side view of my invention in partial section covering a device for connecting the adjacent ends of two cables and shows the cables and parts in final relative position.

In the preferred embodiment of my invention I employ a body member 1 having a recess 2 and threaded ends 3. In this device both ends of the splicer are duplicates.

Threadedly secured to the member 1 is a housing 4 with a tapered interior passage 5 therethrough. The interior face of the wall of the member 4 is shown as uniformly tapered from end to end. The larger end of the housing 4 is provided with threads 6.

Mounted within the housing 4 is a tubular wedge member 7 having a tapered outside surface 8 corresponding to the tapered surface 9 of the housing 4. A straight passage 10 extends entirely through the wedge 7 and the wall of the wedge 7 is provided with slots 11 which separate the wedge 7 into a plurality of sections 12 and 13 and which slots extend almost throughout the length of the wedge, but are uncut at the small end of the wedge with the exception of one slot 11' which is shown as entirely cut through, thus holding the segments of the wedge together, but permitting the wedge to easily be deformed as required.

Figure 4:
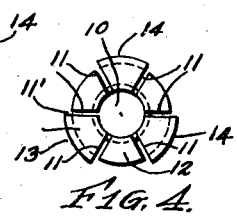
Fig. 4 is an end view of Fig. 3.

The wedge 7 is provided at its enlarged end with projecting flanges 14 arranged to engage the end surface 15 of the housing 4 and prevent the wedge 7 entering the housing 4 beyond a predetermined distance until tension upon the cable equals or exceeds a predetermined amount as later explained and in which case the flanges 14 will then shear and permit the wedge 7 to further enter the housing 4. The flange 14 may be applied to one or more of the segments, but in Fig. 4 is shown as applied to the three segments 13. By varying the number of flanges used and the size of the same, the tension which may preliminarily be placed upon the cable may be determined.

I also employ a tubular chuck member 16 to contact with the end of the wedge 7 and which has an interior tapered surface 17 forming a tapered passage through the chuck 16. Positioned within the chuck 16 is a secondary tubular wedge 18 which has a straight passage therethrough and the wall of which is corrugated as by a screw thread. The outer surface of the wedge 18 is tapered to correspond with the taper of the surface 17 on the chuck and the wall of the wedge 18 is also slotted as at 19, thus producing a wedge which is easily deformable.

The bore 5 of the housing 4 is of a diameter to accommodate the entire cable, but the bore of the wedge 18 is of such a diameter as to accommodate only the core or such central portion of the cable as desired. The outside diameter of the wedge 18 is such as to permit the outer layer or layers of the cable to be interposed between the outer tapered surface of the wedge 18 and the inner tapered surface of the chuck 16.

In assembling the device the cable end is inserted into the hollow of the housing 4 with the end projecting a sufficient distance beyond the large end and the main wedge 7 is then positioned over the end of the cable and into the bore 5 of the housing 4 until the flange 14 rests against the end 15 of the housing 4. The chuck 16 is then slipped over the end of the cable and the wedge 18 inserted between the core and the outer layer or layers of the cable with the core extending into and through the bore of the wedge 18. This positions the outer layer or layers of the cable so that they will be gripped between the wedge 18 and the chuck 16 while the core will be gripped by the chuck 18 as it is squeezed inwardly due to the tension on the cable drawing the cable and wedge 18 inwardly with respect to the chuck 16.

Figure 5:
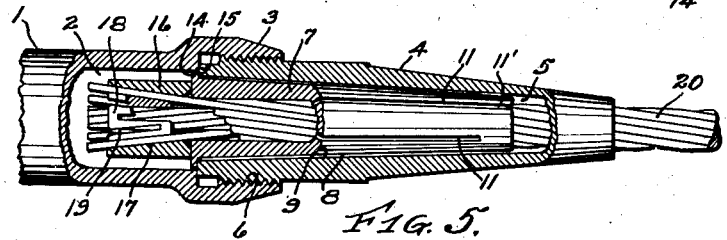
Fig. 5 shows in part the splicer shown in Fig. 1 with the parts and cable in a preliminary relation.

As tension is placed upon the cable 20, the chuck 16 and wedge 18 will be moved with the cable until the chuck rests upon the end face of the wedge 7 shown in Fig. 5. Further movement of the chuck 16 will be prevented due to the flanges 14 resting against the end 15 of the housing 4. Further tension upon the cable 20 will tend to draw the cable through the chuck 16 and with it the wedge 18 and as the wedge 18 advances with the cable it will be compressed into tighter engagement with the core of the cable and at the same time the outer layer of wires will be increasingly gripped between the chuck 16 and the wedge 18. This movement of the cable and change in size of the wedge 18 I find permits an adjustment of the tension to a reasonable degree at least between the outer layer of the cable and the core. After the tension upon the cable has reached a predetermined amount, depending upon the size of the flanges 14, then the lugs 14 will shear due to such stress and permit the wedge 7 together with the chuck 16 and wedge 18 to move together toward the end of the housing 4 and as the wedge 7 advances, it will be compressed into engagement with the outer surface of the cable and will grip the entire cable in proportion to the tension in the cable. The tension throughout the cable, however, has been very largely made uniform through the action of the chuck 16 and wedge 18 and the effect of the pressure upon the cable due to the wedge 7 is more that of holding the cable in position in the housing 4. The entire load is now taken up by the wedge 7.

While the cable 20 might be held by means of the wedge 7 only, I find that where all wires are gripped and compressed together by a single wedge 7 that there is a tendency for the stress in the outer wires to be greater than the stress in the inner wires and vice versa, that is, each wire does not take its portion of the load, but with my arrangement the tension in the cable is distributed quite uniformly between the various wires, or in other words the tension is normalized and many experiments which I have tried show that there is a tendency for breakage to occur quite simultaneously upon each wire when the tension has reached its ultimate.

Figure 2:
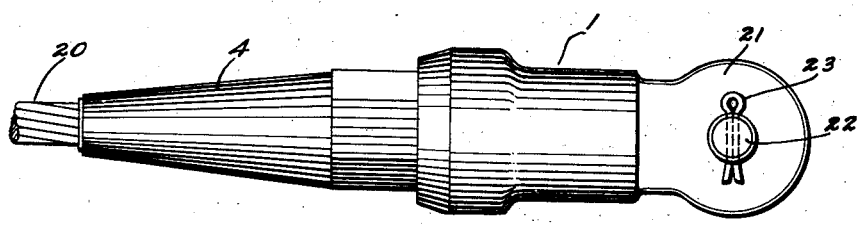
Fig. 2 is exterior view only of my invention as applied to a dead ending device with a clevis end for attaching the device to a support such as a tower or cable.
Figure 3:
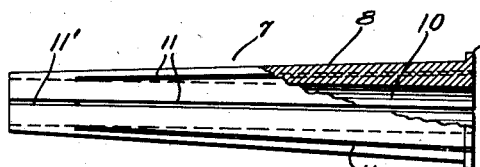
Fig. 3 is a side view in partial section of the load carrying wedge.

In Fig. 2 the parts are the same as in Fig. 1 with the exception that for one housing the clevis member 21 is substituted with a bolt 22 and cotter 23 which permits of dead ending a cable to a support or other cable.

There will be modifications which will suggest themselves to those skilled in the art therefore I wish to be limited only by my claims.

I claim :—

1. A cable splice comprising a connecting member and two housings each having a tapered bore and an abutment and detachably secured to the ends of the said member, a deformable tubular wedge positioned in each housing and having a straight bore to receive a cable end and having an outwardly projecting flange to engage the abutment on the housing to temporarily limit the movement of the wedge into the housing and adapted to shear off under a predetermined strain, a chuck associated with each wedge and having a tapered bore and loosely positioned within the connecting member and arranged to engage the larger end of its associated wedge to move the wedge, a second deformable tubular wedge positioned within each chuck and having a straight bore to receive an interior portion of the cable and spaced from the inner wall of the chuck to form a space to receive the outer portion of the cable, the second wedge adapted to be drawn into its chuck and grip the inner and outer portions of the cable when a stress is applied to the cables and draw the chuck into engagement with the adjacent end of one of the first wedges and force the said first wedge into its housing and shear the said holding flange on such wedge when the force has reached a predetermined value.

2. A cable splice comprising a connecting member and two housings detachably secured to the ends thereof and each housing having a tapered bore, a deformable tubular wedge in each housing to receive a cable and each having means to engage the inner portion of the housing to temporarily limit the movement of the wedges relative to the housings in one direction up to a predetermined stress value upon the connected cables, a pair of chucks within the connecting member and each having a tapered bore, a second deformable tubular wedge positioned in each chuck and having a bore to receive a portion of the cable end and positioned to provide a space between the second wedge and the chuck to receive the other portion of the cable, the cable ends each being primarily gripped by a second wedge and its chuck which is drawn into contact with the associated one of the first mentioned wedges to force the said wedge into its respective housing after said predetermined stress upon the cables is exceeded.

3. A cable splice comprising a connecting member and two housings detachably secured to the connecting member in alinement with each other and each having a tapered bore, each housing provided with a tubular wedge having a deformable wall and a bore to encircle and compress the entire cable adjacent its end and hold the same within the housing, a second tubular wedge having a deformable wall positioned in axial alinement with each of the first said wedges to grip the extreme projecting end of the associated cable and means surrounding each second wedge to force the second wedge into gripping engagement with the cable and having end engagement with the associated first said wedge to draw the first said wedge into its housing and means projecting laterally from the larger end of each first wedge to engage its housing to prevent the wedge from being drawn into the reduced end of the housing until the tension upon the cable exceeds a predetermined value.

4. A cable splicer comprising a connecting member and two housings secured thereto in axial alinement and each having a tapered bore, each housing provided with a main tubular wedge to grip a cable end and a secondary tubular wedge to grip the cable nearer its end than the main wedge, the secondary wedge arranged to grip the cable before the main wedge grips and means to prevent the main wedge from functioning to grip the cable until after the tension in the cable has reached a predetermined value.

5. A cable splicer comprising a connecting member and two housings secured thereto in axial alinement and each having a tapered bore, each housing provided with a main tubular wedge to grip a cable end and a secondary tubular wedge to grip the cable nearer its end than the main wedge, the secondary wedge arranged to grip the cable before the main wedge grips the cable.

6. A cable splicer comprising a connecting member and two housings secured thereto and each having a tapered bore, each housing having a tubular compressible wedge to receive and grip a cable and means to limit its movement in one direction within the housing until the tension in the cable exceeds a predetermined value and means to grip the cable end and transmit the cable tension to the tubular wedge.

7. A cable fitting comprising a body member and a housing detachably secured to the body at one end thereof and having a tapered bore, a tubular wedge mounted to move in the housing and having a bore to receive a cable end and the walls of the wedge being compressible into gripping engagement with the cable and having means to limit the movement of the wedge in said direction until the tension on the cable exceeds a predetermined value; means to grip the cable end and transmit the cable tension to the tubular wedge and means on the other end of the body to receive supporting means therefor and to resist the tension in the cable.

8. A cable splice comprising a connecting member and two housings secured thereto and each having a tapered bore, each housing having a tubular wedge therein to receive and grip a cable adjacent its end and having holding means to limit the movement of the wedge relative to its housing in one direction and permit initial movement of the cable relative to the wedge until the cable tension equals a predetermined value and the holding means yields, wedging mechanism associated with each tubular wedge and having means to grip two portions of the cable end independent of each other and permit initial movement of the two portions relative to a part of the wedging mechanism as the tension in the cable increases, the wedging mechanism transmitting the tension in the cable to the tubular wedge.

9. A splicer for cables comprising a connecting member and two housings secured thereto and each having a main tubular wedge movable in its housing, to receive and grip the cable adjacent its end and having means to temporarily arrest its movement and auxiliary gripping mechanism comprising a tubular wedge having a roughened bore to receive the cable at its end and a holder for the wedge to effect a grip between the wedge and the cable and to grip the cable prior to the main wedge.

10. A cable splicer comprising a housing having a tapered bore, a tubular compressible wedge in the housing, to receive and grip a cable, means to limit the compression of the wedge upon the cable until the tension in the cable has reached a predetermined value, means to grip the cable end and transmit the tension in the cable to the tubular wedge and means to secure the housing to a support.

11. A cable splice comprising two housings and a member connecting the same, one housing being detachably secured to the connecting member and each housing having a tapered bore and provided with a tubular wedge having a deformable wall and a bore to receive the cable adjacent its end and compress and hold the cable end within its housing, a second tubular wedge having a deformable wall positioned in axial alinement with each of the first said wedges and having a bore to receive and grip the extreme end of the cable and means surrounding each second wedge to force it into gripping engagement with the cable and cooperating with its first said wedge to move the said first wedge towards the reduced end of the housing when the cable is placed under tension and means to prevent the first said wedges from being drawn into the reduced ends of the housings beyond a predetermined distance until the tension upon the cable exceeds a predetermined value.

In testimony whereof I affix my signature.

SAMUEL S. MATTHES.